United States Patent
Emberty et al.

(10) Patent No.: US 6,697,891 B2
(45) Date of Patent: Feb. 24, 2004

(54) PARALLEL READ/WRITE CIRCUIT AND METHOD FOR EFFICIENT STORING/RETRIEVAL OF DATA TO/FROM A RECORDING MEDIUM

(75) Inventors: Robert George Emberty, Tucson, AZ (US); Craig Anthony Klein, Tucson, AZ (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 370 days.

(21) Appl. No.: 09/761,356

(22) Filed: Jan. 16, 2001

(65) Prior Publication Data

US 2002/0095536 A1 Jul. 18, 2002

(51) Int. Cl.$^7$ .............................................. G06F 13/14
(52) U.S. Cl. ............................. 710/65; 360/27; 360/39; 360/137
(58) Field of Search ............................. 710/65; 360/27, 360/39, 137

(56) References Cited

U.S. PATENT DOCUMENTS

| | | | |
|---|---|---|---|
| 3,831,191 A | | 8/1974 | Gold |
| 4,274,120 A | | 6/1981 | Farnham |
| 4,361,844 A | | 11/1982 | Nozaki et al. |
| 4,469,941 A | | 9/1984 | Palmer |
| 4,558,380 A | | 12/1985 | Porter |
| 4,688,106 A | | 8/1987 | Keller et al. |
| 5,274,507 A | | 12/1993 | Lee |
| 5,481,518 A | | 1/1996 | Kashida et al. |
| 5,491,607 A | * | 2/1996 | Bennett et al. ............. 360/137 |
| 5,519,684 A | | 5/1996 | Iizuka et al. |
| 5,737,632 A | | 4/1998 | Oeda et al. |
| 5,739,996 A | | 4/1998 | Bennett et al. |
| 5,748,575 A | * | 5/1998 | Lee ............................. 369/30 |
| 5,793,727 A | | 8/1998 | Ishibashi et al. |
| 5,850,381 A | | 12/1998 | Miyano |
| 5,905,600 A | | 5/1999 | Nieuwkerk |
| 6,301,066 B1 | * | 10/2001 | Uno ............................. 360/45 |

OTHER PUBLICATIONS

"Fast Access Disk File with Several Parallel Heads", IBM Technical Disclosure Bulletin, vol. 25, No. 6, Nov. 1982, A. Blum, IBM Corp. 1982.

* cited by examiner

Primary Examiner—Abdelmoniem I Elamin
(74) Attorney, Agent, or Firm—Robert B. Martin; Bracewell & Patterson, L.L.P.

(57) ABSTRACT

A parallel read/write circuit for use with a plurality of transducer head assemblies and method of operation thereof. The parallel read/write circuit includes a parallel read/write cache, e.g., a bidirectional parallel-serial converter buffer in one advantageous embodiment. A byte-to-bit disassembler, coupled to the parallel read/write cache, receives parallel data from the parallel read/write cache and transmits each bit of the parallel data to a separate transducer head assembly, where each bit of the parallel data is written onto a different disk surface of a recording medium at substantially the same time. In an advantageous embodiment, the byte-to-bit disassembler is a parallel in/parallel out shift register. The parallel read/write circuit also includes a bit-to-byte assembler, coupled to the parallel read/write cache and the transducer head assemblies, that combines a plurality of data bits into parallel data form, wherein each of the data bits is read from a separate disk surface of the recording medium at substantially the same time. In an advantageous embodiment, the bit-to-byte assembler is a parallel in/parallel out shift register. Alternatively, in another advantageous embodiment, both the bit-to-byte assembler and the byte-to-bit disassembler are the same device.

18 Claims, 4 Drawing Sheets

PARALLEL READ/WRITE CIRCUIT AND METHOD FOR EFFICIENT STORING/ RETRIEVAL OF DATA TO/FROM A RECORDING MEDIUM

BACKGROUND OF THE INVENTION

1. Technical Field

The present invention relates in general to digital data storage systems and, in particular, to the storing and retrieval of data to and from a recording medium. More particularly, the present invention relates to a parallel read/write circuit and a method thereof for efficient storing/retrieval of data to and from a recording medium.

2. Description of the Related Art

A conventional disk drive typically includes one or more magnetic disk platters mounted for rotation on a hub or spindle. A typical disk drive also includes a transducer head supported by a hydrodynamic air bearing that hovers above each magnetic disc. A drive controller is conventionally utilized for controlling the disk drive based on commands received from a host system. The drive controller controls the disk drive to retrieve information from the magnetic disks and to store information on the magnetic disks.

An electromechanical actuator operates within a negative feedback, closed-loop servo system to position the transducer head. The actuator moves the transducer head radially over the disk surface for track seek operations and holds the transducer head directly over a track on the disk surface for track following operations. Information is typically stored in concentric tracks on the surface of the magnetic disks. A number of axially aligned tracks on the disk surfaces are collectively referred to as a cylinder. Data is written to the disk by providing a write signal to one of the transducer heads to encode flux reversals on the surface of the magnetic disk representing the data to be stored. In retrieving data from the disk, the drive controller controls the electromechanical actuator so that the transducer head flies above the magnetic disk, sensing the flux reversals on the magnetic disk and generating a read signal based on those flux reversals. The read signal is typically conditioned and then decoded by the drive controller to recover data represented by flux reversals stored on the magnetic disc and consequently represented in the read signal provided by the transducer head.

In an embedded servo-type system, servo information is recorded on tracks that also contain data stored on the disk drive. The servo data (or servo bursts) are written on the data tracks and are commonly and evenly temporally spaced (or angularly spaced) about the circumference of each track. Data to be stored on the disk drive is written between the servo bursts. Also, some disk surfaces include header information in header fields that are also written on the disk. Header fields correspond to the servo bursts, or may number less than the servo bursts, i.e., they may correspond to every other servo burst, and so on. As a transducer head reads the servo information, the transducer head provides a position signal which is decoded by a position demodulator and presented in digital form to a servo control processor. The servo control processor compares the actual radial position of the transducer head over the disk (as indicated by the embedded servo burst) with the desired position and commands the actuator to move in order to minimize position error. Additionally, when the host system requests that the disk drive access a new portion of the disk surfaces, the servo control processor controls the disk drive to move the plurality of data heads to an appropriate cylinder to begin accessing the designated disk surface.

In large data throughput environments, such as audio and video environments, random access of the large chunks of data associated with these environments in a rapid fashion presents significant problems. However, conventional disk drive data storage systems typically store and retrieve data to and from a recording medium in a serial manner. That is, data is read and written to and from the recording medium, i.e., disk surfaces, one bit at a time. It is desirable to optimize the rate at which data can be written onto the storage medium, and to optimize the rate at which data can be read from the storage medium.

Accordingly, what is needed in the art is an improved method for optimizing the rate at which data can be written onto the storage medium, and to optimize the rate at which data can be read from the storage medium.

SUMMARY OF THE INVENTION

It is therefore an object of the invention to provide an improved method for storing and retrieving data to and from a recording medium.

It is another object of the invention to provide a circuit for parallel reading and writing of data to and from a recording medium.

To achieve the foregoing objects, and in accordance with the invention as embodied and broadly described herein, a parallel read/write circuit for use with a plurality of transducer head assemblies is disclosed. The parallel read/write circuit includes a parallel read/write cache, e.g., a bidirectional parallel-serial converter buffer in one advantageous embodiment. A byte-to-bit disassembler, coupled to the parallel read/write cache, receives parallel data from the parallel read/write cache and transmits each bit of the parallel data to a separate transducer head assembly, where each bit of the parallel data is written onto a different disk surface of a recording medium at substantially the same time. In an advantageous embodiment, the byte-to-bit disassembler is a parallel in/parallel out shift register. The parallel read/write circuit also includes a bit-to-byte assembler, coupled to the parallel read/write cache and the transducer head assemblies, that combines a plurality of data bits into parallel data form, wherein each of the data bits is read from a separate disk surface of the recording medium at substantially the same time. In an advantageous embodiment, the bit-to-byte assembler is a parallel in/parallel out shift register. Alternatively, in another advantageous embodiment, both the bit-to-byte assembler and the byte-to-bit disassembler are the same device.

In another aspect of the present invention, a method for parallel writing of data to a recording medium having a plurality of disk platters, wherein each of the disk platters has at least one magnetic surface, is disclosed. The method includes converting input data designated for storage into a parallel data word size that is equivalent to the number of magnetic surfaces in the recording medium. Next, the parallel data is "disassembled" into its constituent individual bits of data. Subsequently, each of the individual bits of data are then written onto a separate magnetic surface of said recording medium at substantially the same time. Alternatively, in the case of a read operation, a number of data bits are read off the recording medium at substantially the same time, wherein each one of the data bits is read from a separate magnetic surface of the recording medium. The data bits are then combined into a parallel data stream. Next, the parallel data stream is converted into a data format compatible with a requesting system.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
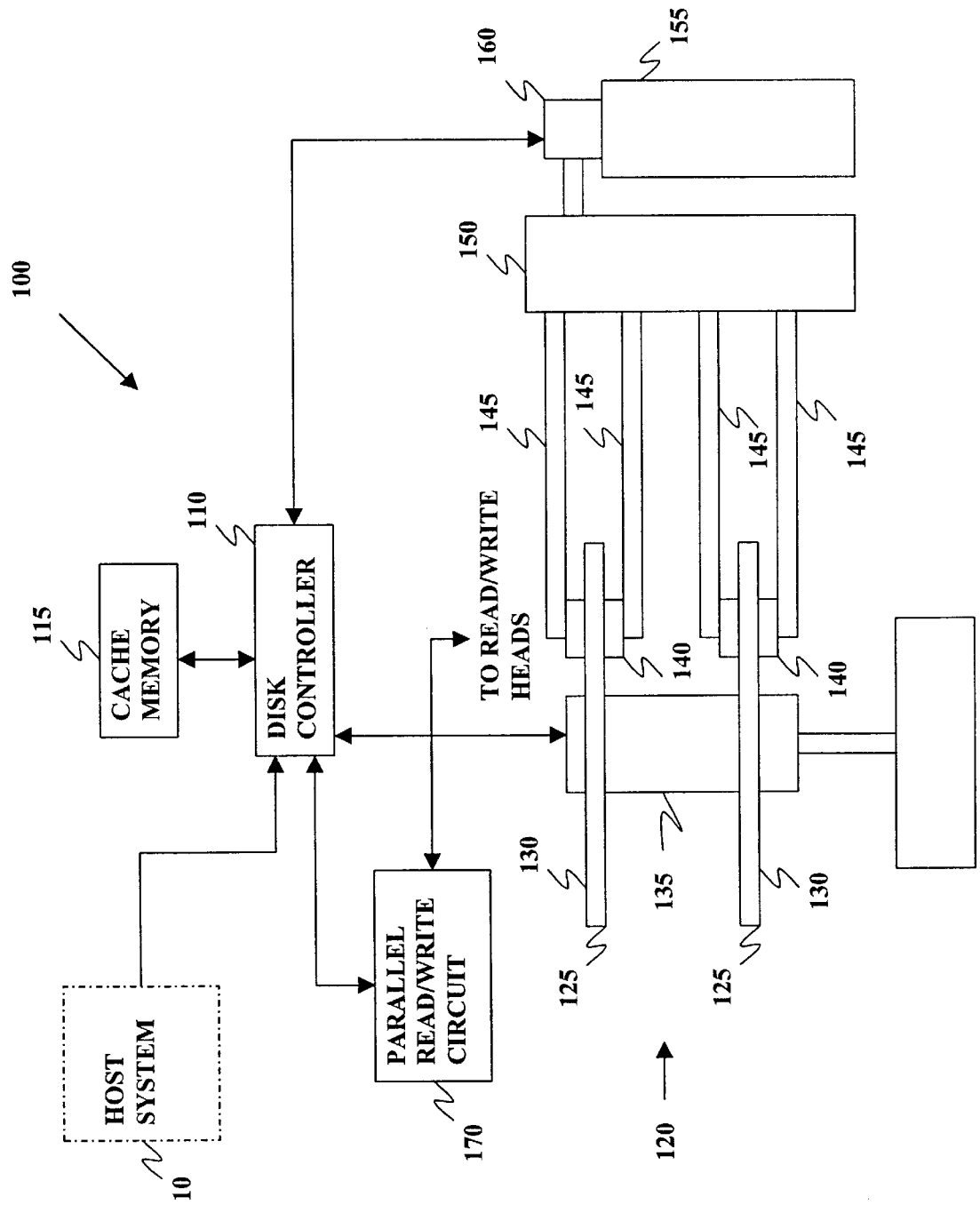
FIG. 1 illustrates an embodiment of a digital data storage system in accordance with the present invention.

With reference now to the figures and in particular with reference to FIG. 1, there is depicted an embodiment of a digital data storage system 100 in accordance with the present invention. Data storage system 100 is illustrated in a simplified and diagrammatic form sufficient for an understanding of the present invention and includes a controller 110 coupled to a cache memory 115. It should be noted that the utility of the present invention is not limited to the details of any one particular data storage system construction.

Data storage system 100 also includes a stack 120 of disks, generally designated 125, each of which having at least one magnetic surface 130. Disks 125 are generally mounted parallel to one another for simultaneous rotation on and by an integrated spindle and motor assembly 135. Information on each magnetic disk surface 130 is read from or written to disk surface 130 by a corresponding transducer head assembly 140 movable in a path having a radial component across rotating disk surface 130.

Each transducer head 140 is mounted on a flexure spring (not shown) carried by an arm 145. Arms 145 are typically ganged together for simultaneous pivotal movement about a support spindle 150. One arm 145 includes an extension driven in pivotal movement by a head drive servo motor 155 that includes a voice coil 160 cooperating with an internal magnet and core assembly. Drive signals applied to voice coil 160 cause arms 145 to move in unison to position transducer heads 140 in registration with information storage tracks on disk surfaces 130 where information is written or read.

Data storage system 100 is controlled in operation by signals provided by controller 110, including motor control and head positioning signals. In a typical arrangement, controller 110 provides an interface with a host system 10, such as a conventional computer, that, in an advantageous embodiment, provides data read and write commands. Servo position information is recorded on disk surface 130 and transducer heads 140 read this servo information to provide a servo position signal to controller 110. This information is utilized by controller 110 to provide position control signals. The purpose of this position feedback system is to assure accurate and continuous positioning of transducer heads 140 so that data is written to or read from precise locations on disk surfaces 130.

Data storage system 100 also includes a parallel read/write circuit 170 coupled to disk controller 110 that converts that conventional serial data flow to and from disk controller 110 to a parallel reading/writing data operation utilizing transducer head assemblies 140. The construction and operation of parallel read/write circuit 170 will be described hereinafter in greater detail with respect to FIGS. 2, 3A and 3B.

Figure 2:
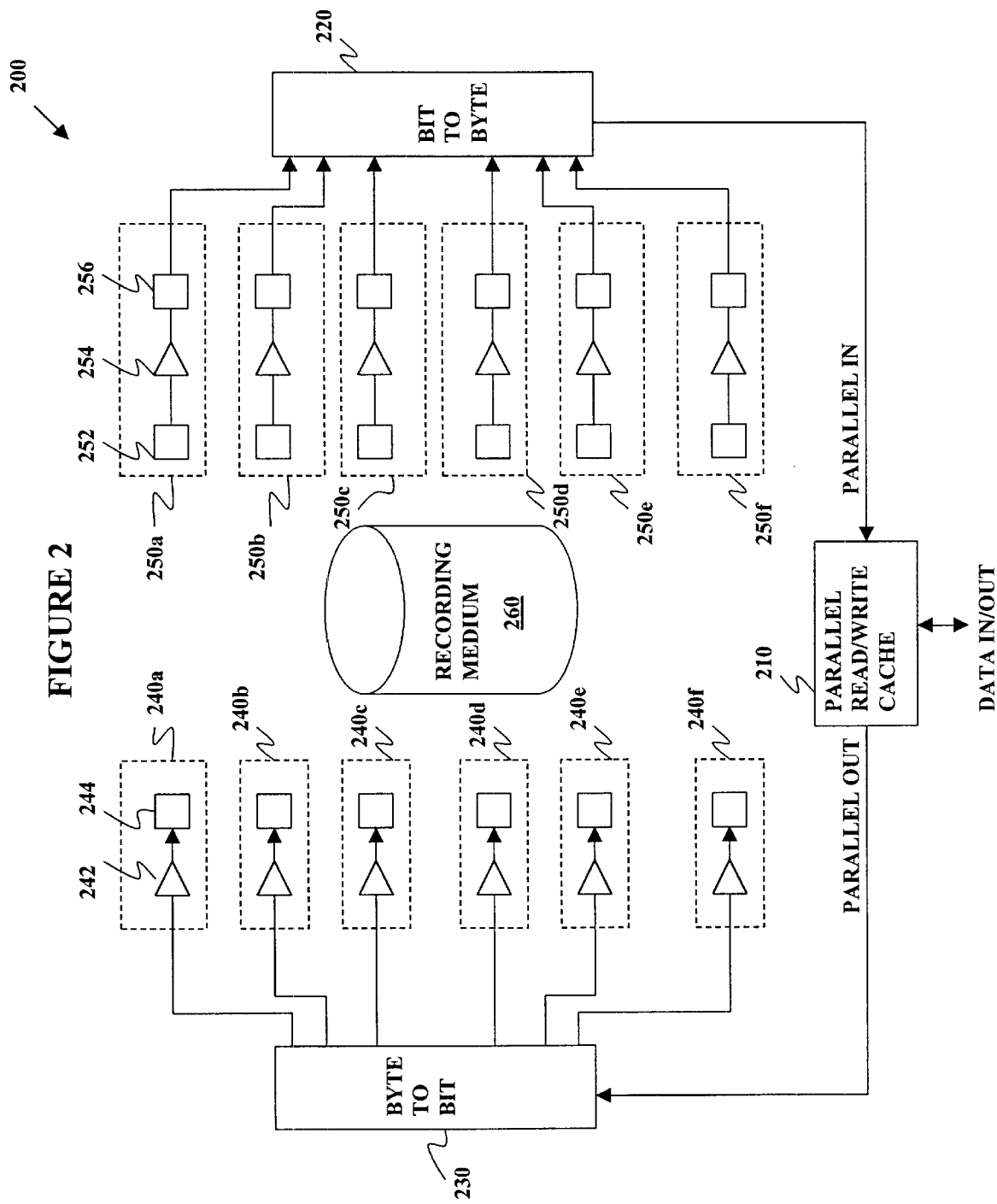
FIG. 2 illustrates a simplified block diagram of an embodiment of a parallel read/write circuit according to the principles disclosed by the present invention.

Referring now to FIG. 2, there is illustrated a simplified block diagram of an embodiment of a parallel read/write circuit 200 according to the principles disclosed by the present invention. Parallel read/write circuit 200 includes a parallel read/write cache 210 coupled to a bit-to-byte assembler 220 and a byte to bit disassembler 230. In a write mode of operation, parallel read/write cache 210, e.g., a conventional buffer, generally receives parallel data from a host system (analogous to host system 10 in FIG. 1) for storage on a recording medium 260, analogous to disks 125 depicted in FIG. 1. Parallel read/write cache 210 "reformats" the data into a data word size that is equivalent to the number of transducer heads utilized in recording medium 260. For example, if the host system is transmitting 16-bit wide data words and there are only eight transducer heads in recording medium, parallel read/write cache 210 will convert the 16-bit wide data words into a 8-bit wide data words. The reformated data word signals are then transmitted to byte-to-bit disassembler 230 that, in turn, translates the parallel data signals into single bit data signals prior to transmitting the data signals to a plurality of write circuits, generally designated 240a through 240f. In the case where parallel read/write cache 210 receives serial data from the host system, a conventional bidirectional parallel-serial converter buffer may be advantageously utilized in parallel read/write 210 to convert and reformat the received serial data into the required parallel data word size. In an advantageous embodiment, byte-to-bit disassembler 230 is a parallel in/parallel out shift register. Each of the write circuits 240a–240f includes a write driver 242, e.g., a preamplifier, that amplifies the associated single bit data signal prior to a transducer head 244 recording the single bit data signal on recording medium 260.

In the case of a read operation, a plurality of read circuits, generally designated 250a through 250f, is utilized to read encoded data on recording medium 260. Each of the plurality of read circuits 250a–250f includes a read transducer head 252, a preamplifier 254 and a clock and detect circuit 256 that reads a clock signal on recording medium 260. Data read by each of the plurality of read circuits 250a–250f are transmitted to bit-to-byte assembler 220, where the individual bit data signals are combined into a parallel data signal format prior to transmission to cache 210. In an advantageous embodiment, bit-to-byte assembler 220 is a parallel in/parallel out shift register. It should be noted that a transducer head assembly (analogous to transducer head assembly 140 depicted in FIG. 1) generally includes a read and a write circuit. Thus, for example, a first transducer head assembly includes write circuit 240a and a read circuit 250a while a second transducer head assembly includes write circuit 240b and read circuit 250b.

Alternatively, in another advantageous embodiment, a serial bit first in first out (FIFO) buffer, e.g., a shift register, may be utilized in place of parallel read/write cache 210 to resize the read or write data word in accordance with the number of transducer heads utilized in recording medium 260. A serial FIFO buffer is located between byte-to-bit disassembler 230 and the plurality of write circuits 2140a–240f and another serial FIFO buffer is placed between bit-to-byte assembler 220 and the plurality of read circuits 250a–250f.

The read/write circuits detect and decode data pulses from read signals transmitted by the preamplifiers coupled to the transducer heads so as to apply them to a disk controller, such as controller 110 shown in FIG. 1, and conversely the read/write circuits decode write data from the disk controller to apply to the preamplifiers. When retrieving data, the preamplifiers amplify signals picked up by the transducer heads from the recording medium so as to apply them to the read/write circuits and, when recording data, the preamplifiers select the transducer heads in response to the instruction of the disk controller so as to record the encoded write data received from the read/write circuits on the corresponding disk platters.

The read/write circuits typically control internal constituent circuits (not shown) through an internal built-in serial port under the control of a processor. Various states of the internal constituent circuit blocks of a read/write channel circuit are transferred through a serial port to the processor. Namely, the above serial port is a bidirectional port which serially interfaces between the read/write channel circuit and the processor. For example, a read/write circuit includes an ENcoder/DECoder (ENDEC) which decodes recording data and encodes synchronous reading data, a pulse and servo detector which detects the amplitude of a burst to generate position error signals and detects peak values of amplitudes of the preamplified signals, and a data separator which separates read data, synchronized with specific clocks, from data pulses generated by the pulse and servo detector. The read/write circuit further includes an automatic gain control circuit (AGC), a programmable filter, a hysteresis qualifier, etc. Each of the internal constituent circuits has respective registers for storing information used for operational control of the corresponding circuit.

The built-in serial port in the read/write channel circuit has n number of serial port registers. For example, n number of state control registers are respective registers for setting power-down, data mode cut-off, servo mode cut-off, filter boost, data threshold value, servo threshold value, data restoring, and AGC level, etc. Each of the registers has a specific control value for setting its corresponding function. The processor applies the serial port control signals, such as SDEN, SDATA and SCLK, to the above serial port, where SDEN is a data transmission enabling signal, SDATA is serial data of the processor, and SCLK is a serial clock signal. The SDATA carries the address for selecting the specified state control register of the serial port and the data for reading, or writing, the control state of the register selected by the above address. The address of the serial data includes the read/write selection bits for controlling the data reading and/or writing selections. The operation of parallel read/write circuit 200 in the context of a write and a read operation will be hereinafter be described in greater detail with respect to FIGS. 3A and 3B, respectively.

Figure 3A:
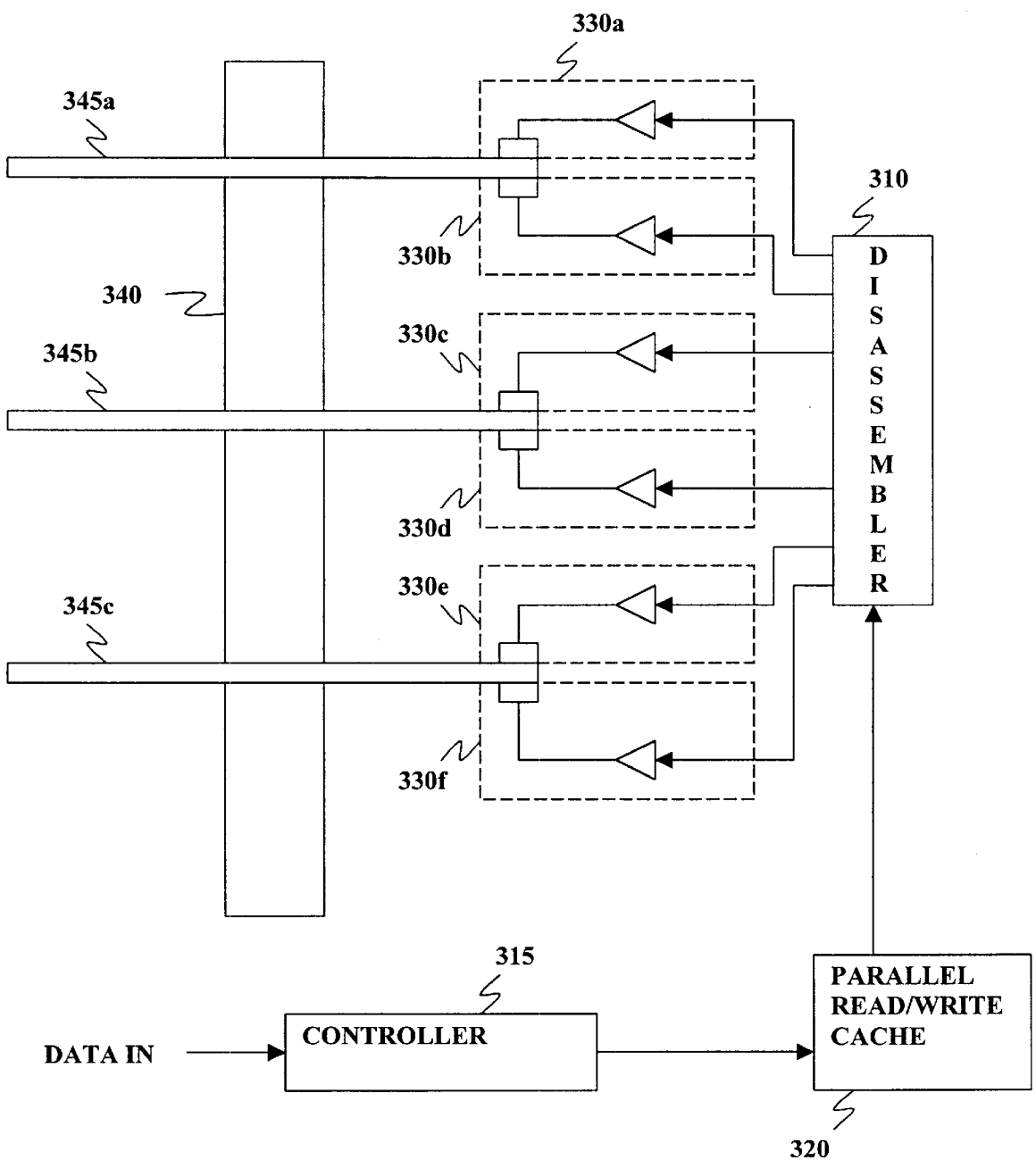
FIG. 3A illustrates a simplified block diagram representation of a write operation according to the principles of the present invention.
Figure 3B:
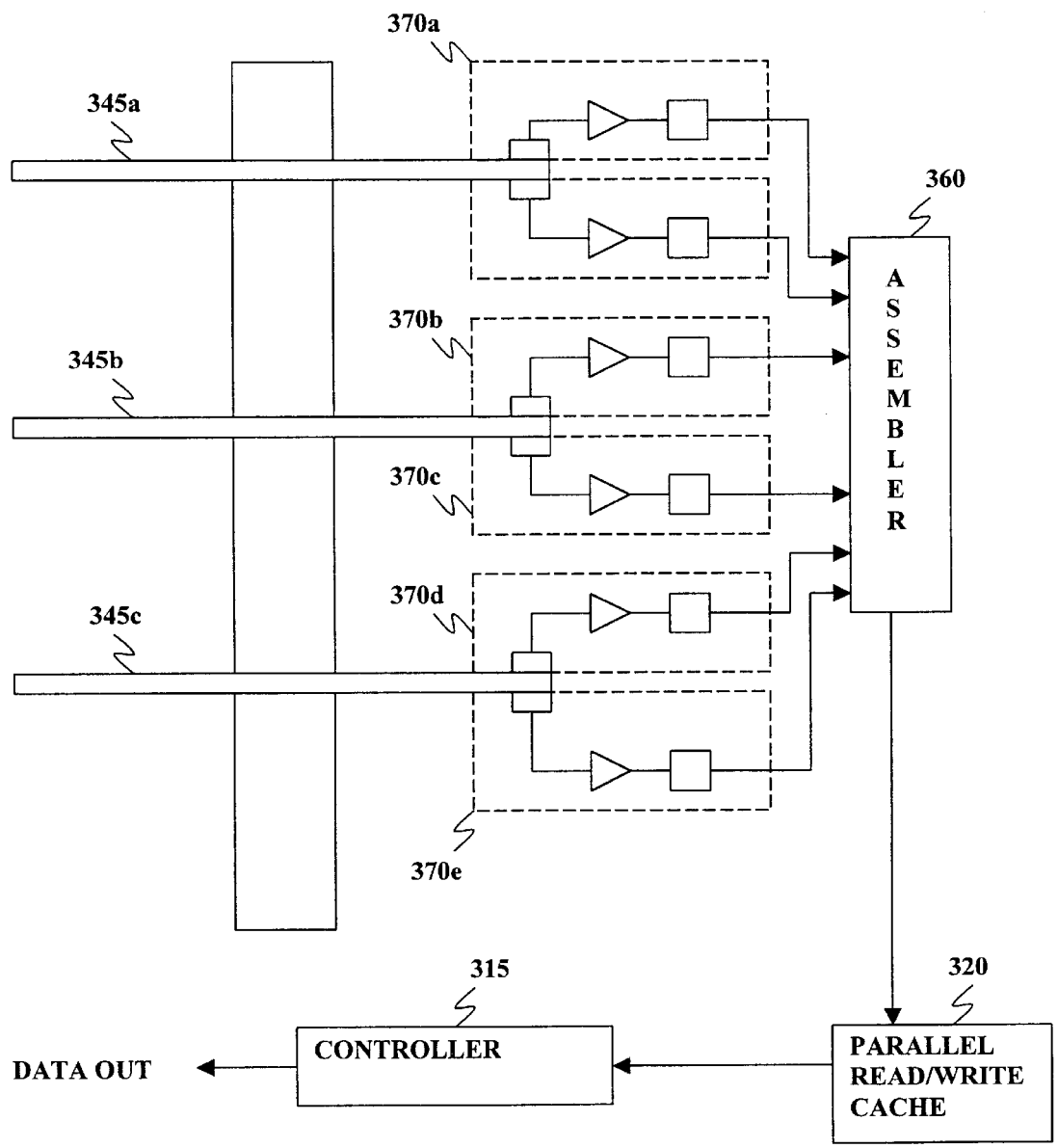
FIG. 3B illustrates a simplified block diagram representations of a read operation according to the principles of the present invention.

Turning now to FIGS. 3A and 3B, there are depicted simplified block diagram representations of write and read operations according to the principles of the present invention. As illustrated in FIG. 3A, a host system (analogous to host system 10 in FIG. 1) initiates a write operation by sending data to a controller 315 (analogous to disk controller 110 in FIG. 1). Controller 315, in turn, positions first through sixth write circuits 330a–330f over a plurality of disk platters, designated first, second and third disk platters 345a–345c, that are attached to a spindle 340. In the illustrated embodiment, each disk platter has two associated write circuits, one for each disk surface. Thus, e.g., the transducer heads in first and second write circuit 330a, 330b are located over their corresponding disk surface of first disk platter 345a. It should be noted that although the illustrated embodiment depicts only three disk platters and six write circuits, the present invention does not contemplate limiting its practice to any one set number of disk platters and/or write circuits.

While the transducer heads are being positioned over their respective disk surface, controller 315 transmits the data to parallel read/write cache 320. Parallel read/write cache 320, in turn, converts the input data, if it is not already, into a parallel format and "resizes" the data into a 6-bit wide data word format before sending the parallel data to a byte-to-bit disassembler 310. Byte-to-bit disassembler 310 "breaks down" the parallel data received from parallel read/write cache 320 into its constituent bits and sends each individual bit to a separate write circuit. Consequently, data is written onto the recording medium, one bit on each surface of the disk platters in a single bit access time.

In the case of a read operation as illustrated in FIG. 3B, a read data request is initiated by the host system to controller 315. The data request is "processed" by controller 315 whereby controller 315 first determines if the requested data is resident in any attached cache memory, such as cache memory 115. In the event that the requested data is not available in a cache memory, controller 315 positions first through sixth read circuits 370a–370f over first, second and third disk platters 345a–345c corresponding to the location of the data requested. As with the case of the write operation, each disk platter has two associated read circuits, one for each disk surface. After all the transducer heads have been positioned, data is read off the disk platters in a parallel fashion (six bits at a time in the illustrated embodiment). The bits of data are then provided to a bit-to-byte assembler 360 that "assembles" the data bits into a parallel data format prior to transmission to parallel read/write cache 320. In another advantageous embodiment, bit-to-byte assembler 360 is the same device utilized for byte-to-bit disassembler 340 depicted in FIG. 3A. Parallel read/write cache 320, in turn, resizes the data word prior to providing the data to the requesting host system via controller 315.

While the invention has been particularly shown and described with reference to a preferred embodiment, it will be understood by those skilled in the art that various changes in form and detail may be made therein without departing from the spirit and scope of the invention.

What is claimed is:

1. A parallel read/write circuit for use with a plurality of transducer head assemblies, comprising:
   a parallel read/write cache storing data words;
   a byte-to-bit disassembler, coupled to said parallel read/write cache, that receives data encoded as one or more data word from said parallel read/write cache and transmits each bit of said data word to a separate one of said plurality of transducer head assemblies, wherein said each bit of said data word is written onto a separate disk surface of a recording medium at substantially the same time; and a bit-to-byte assembler, coupled to said parallel read/write cache and said plurality of transducer head assemblies, that combines a plurality of data bits into a data word and transmits said data word to said parallel read/write cache, wherein each of said plurality of data bits is read from a separate disk surface of said recording medium at substantially the same time.

2. The parallel read/write circuit as recited in claim 1, wherein said parallel read/write cache is a bidirectional parallel-serial converter buffer.

3. The parallel read/write circuit as recited in claim 1, wherein said byte-to-bit disassembler is a parallel in/parallel out shift register.

4. The parallel read/write circuit as recited in claim 1, wherein said bit-to-byte assembler is a parallel in/parallel out shift register.

5. The parallel read/write circuit as recited in claim 2, wherein said byte-to-bit disassemble and said bit-to-byte assembler are the same.

6. The parallel read/write circuit as recited in claim 1, wherein said recording medium includes a plurality of disk platters, wherein each of said plurality of disk platters having at least one disk surface.

7. A method for parallel writing of data words to a recording medium having a plurality of disk platters, wherein each of said plurality of disk platters having at least one magnetic surface, comprising:

converting input data words into one or more data word, each of a size equivalent to the number of magnetic surfaces in said recording medium;

disassembling said data word into individual bits of data; and writing each of said individual bits of data onto a separate magnetic surface of said recording medium at substantially the same time.

8. The method as recited in claim 7, wherein said converting input data into one or more data word includes utilizing a bidirectional parallel-serial converter buffer.

9. The method as recited in claim 7, wherein said disassembling said data word includes utilizing a parallel in/parallel out shift register.

10. A method for parallel reading of data from a recording medium having a plurality of disk platters, wherein each of said disk platters having at least one magnetic surface, comprising:

reading a plurality of data bits at substantially the same time, wherein each of said plurality of data bits is read from a separate magnetic surface of said recording medium; and combining said plurality of data bits into a parallel data stream utilizing a bit-to-byte assembler such that said parallel data stream includes one or more data words.

11. The method as recited in claim 10, wherein said bit-to-byte assembler is a parallel in/parallel out shift register.

12. The method as recited in claim 10, further comprising converting said parallel data stream into a serial data stream.

13. The method as recited in claim 10, wherein said converting said parallel data stream into a serial data stream includes utilizing a bidirectional parallel-serial converter buffer.

14. A data storage device, comprising:

a controller;

a recording medium having a plurality of disk platters, wherein each of said plurality of disk platters having at least one magnetic surface;

a plurality of transducer head assemblies, wherein each of said plurality of transducer head assemblies is associated with a corresponding magnetic surface of said plurality of disks; and a parallel read/write circuit, coupled to said plurality of transducer head assemblies, including:

a parallel read/write cache storing one or more data words;

a byte-to-bit disassembler, coupled to said parallel read/write cache, that receives data encoded as one or more data word from said parallel read/write cache and transmits each bit of said data word to a separate one of said plurality of transducer head assemblies, wherein said each bit of said data word is written onto a separate disk surface of a recording medium at substantially the same time; and a bit-to-byte assembler, coupled to said parallel read/write cache and said plurality of transducer head assemblies, that combines a plurality of data bits into a data word and transmits said data word to said parallel read/write cache, wherein each of said plurality of data bits is read from a separate disk surface of said recording medium at substantially the same time.

15. The data storage device as recited in claim 14, further comprising a cache memory coupled to said controller.

16. The data storage device as recited in claim 14, wherein said parallel read/write cache is a bidirectional parallel-serial converter buffer.

17. The data storage device as recited in claim 14, wherein said byte-to bit disassembler is a parallel in/parallel out shift register.

18. The data storage device as recited in claim 14, wherein said bit-to-byte assembler is a parallel in/parallel out shift register.

* * * * *